US010113639B2

(12) United States Patent
Kline et al.

(10) Patent No.: US 10,113,639 B2
(45) Date of Patent: Oct. 30, 2018

(54) TRANSMISSION WITH L1-L2 SHIFT METHOD WHILE ENGINE BRAKING

(71) Applicant: GM GLOBAL TECHNOLOGY OPERATIONS LLC, Detroit, MI (US)

(72) Inventors: Scott A. Kline, Richmond, MI (US); Patrick M. Gibson, Ypsilanti, MI (US); Raj Kommareddy, South Lyon, MI (US); Roberto Diaz, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 542 days.

(21) Appl. No.: 14/959,258

(22) Filed: Dec. 4, 2015

(65) Prior Publication Data

US 2017/0159815 A1     Jun. 8, 2017

(51) Int. Cl.

| F16H 61/686 | (2006.01) |
|---|---|
| F16H 61/02 | (2006.01) |
| F16H 61/06 | (2006.01) |
| F16H 61/21 | (2006.01) |
| F16H 61/04 | (2006.01) |

(52) U.S. Cl.
CPC ....... *F16H 61/686* (2013.01); *F16H 61/0213* (2013.01); *F16H 61/061* (2013.01); *F16H 61/21* (2013.01); *B60Y 2400/427* (2013.01); *F16H 2061/0237* (2013.01); *F16H 2061/0462* (2013.01); *F16H 2061/0496* (2013.01); *F16H 2200/0065* (2013.01); *F16H 2200/2079* (2013.01); *F16H 2200/2084* (2013.01)

(58) Field of Classification Search
CPC ..... F16H 2061/0237; F16H 2061/0241; F16H 2061/044; F16H 2061/0455; F16H 2061/0462; F16H 2061/0496; F16H 61/0213; F16H 61/061; F16H 61/686

See application file for complete search history.

(56) References Cited

U.S. PATENT DOCUMENTS 7,491,151 B2 * 2/2009 Maguire ............... B60W 10/02
                                                              477/107
9,102,315 B2 * 8/2015 Dlugoss ............. F16H 61/0437

FOREIGN PATENT DOCUMENTS

| CN | 1975139 A | 6/2007 |
|---|---|---|
| CN | 102292573 A | 12/2011 |
| CN | 103047407 A | 4/2013 |
| CN | 103775624 A | 5/2014 |

(Continued)

*Primary Examiner* — Erin D Bishop
(74) *Attorney, Agent, or Firm* — Quinn IP Law

(57) ABSTRACT

A transmission includes a stationary member, an input member, and gear sets each having a plurality of nodes. The transmission includes a first clutch that connects a node of one gear set to the stationary member to establish an L1 mode, and a second clutch that connects a node of another gear set to the stationary member to establish a 2L mode. A SOWC is connected between nodes of two gear sets, and a controller, in response to a requested shift L1-L2 shift while engine braking, executes a method to release the first clutch and thereby enters a neutral mode. The SOWC is released when slip across the first clutch exceeds a first threshold, then the first clutch reapplied when a SOWC slip level exceeds another threshold to thereby enter a $1^{st}$ gear freewheeling mode. The second clutch is reapplied to enter the L2 mode and resume engine braking.

15 Claims, 2 Drawing Sheets

(56) References Cited

FOREIGN PATENT DOCUMENTS

| | | |
|---|---|---|
| CN | 103791076 A | 5/2014 |
| CN | 104514871 A | 4/2015 |
| CN | 104675984 A | 6/2015 |
| EP | 0707164 A2 | 4/1996 |
| JP | H05306754 A | 11/1993 |
| JP | 2008051260 A | 3/2008 |

\* cited by examiner

TRANSMISSION WITH L1-L2 SHIFT METHOD WHILE ENGINE BRAKING

TECHNICAL FIELD

The present disclosure relates to a transmission and a method for shifting between $1^{st}$ gear low (L1) and $2^{nd}$ gear low (L2) while engine braking.

BACKGROUND

A selectable one-way clutch is a torque-transmitting device that is capable of establishing a mechanical connection between rotatable driving and driven members of a power transmission. A typical selectable one-way clutch is configured to hold torque in one or two rotational directions using torque holding elements such as spring-biased struts. The struts, which pivot between adjacent races, can be selectively depressed into a corresponding strut well of one of the races via rotation of a selector plate. Engagement of the struts holds torque in both rotational directions, while the depression of the struts into the strut wells allows the selectable one-way clutch to overrun or freewheel in one rotational direction. Because of the non-slipping, direct engagement of the individual struts with the races, selectable one-way clutches are typically applied only at low speeds.

SUMMARY

A transmission is disclosed herein for use with an engine. The transmission includes a selectable one-way clutch (SOWC) and a controller programmed to momentarily release the SOWC during an engine braking maneuver while the transmission operates in a $1^{st}$ gear low (L1) mode. The momentary release of the SOWC allows the transmission to be shifted into a $2^{nd}$ gear low (L2) mode, with engine braking possible in both of the L1 and L2 modes.

An example configuration of the transmission includes a stationary member, an input member connectable to the engine, an output member, and gear sets each having a plurality of nodes, including a ring gear, a sun gear, and a carrier member. The transmission further includes first and second clutches and a controller. The first clutch, when applied, connects a node of one of the gear sets to the stationary member to establish the L1 mode. The second clutch, when applied, connects a node of a different one of the gear sets to the stationary member to establish the L2 mode. The SOWC is connected between nodes of two of the gear sets.

The controller is programmed, in response to a requested shift maneuver from L1 to L2 mode while actively engine braking, to release the first clutch and thereby enter a neutral mode of the transmission. The controller then releases the second clutch when a slip level across the first clutch exceeds a first calibrated slip threshold. The controller reapplies the first clutch when a slip level of the SOWC exceeds a second calibrated slip threshold, thereby entering a $1^{st}$ gear freewheeling mode, and reapplies the second clutch to enter the L2 mode and continue engine braking.

A related method of shifting from L1 mode to L2 mode while engine braking includes detecting a requested shift maneuver from L1 to L2 mode during an engine braking maneuver, and then releasing a first clutch to enter a neutral mode of the transmission. As noted above, the first clutch, when applied, connects a node of one of the gear sets to a stationary member to establish the L1 mode. The method includes releasing the SOWC when a slip level across the first clutch exceeds a first calibrated slip threshold, with the SOWC being connected between nodes of two of the gear sets. The first clutch is reapplied via the controller when a slip level across the SOWC exceeds a second calibrated slip threshold to thereby enter a $1^{st}$ gear freewheeling mode. Thereafter, the controller applies the second clutch to connect a node of another one of the gear sets to the stationary member and thereby enter the L2 mode and resume the engine braking maneuver.

The above and other features and advantages of the present disclosure are apparent from the following detailed description of the best modes for carrying out the disclosure when taken in connection with the accompanying drawings.

DETAILED DESCRIPTION

Figure 1:
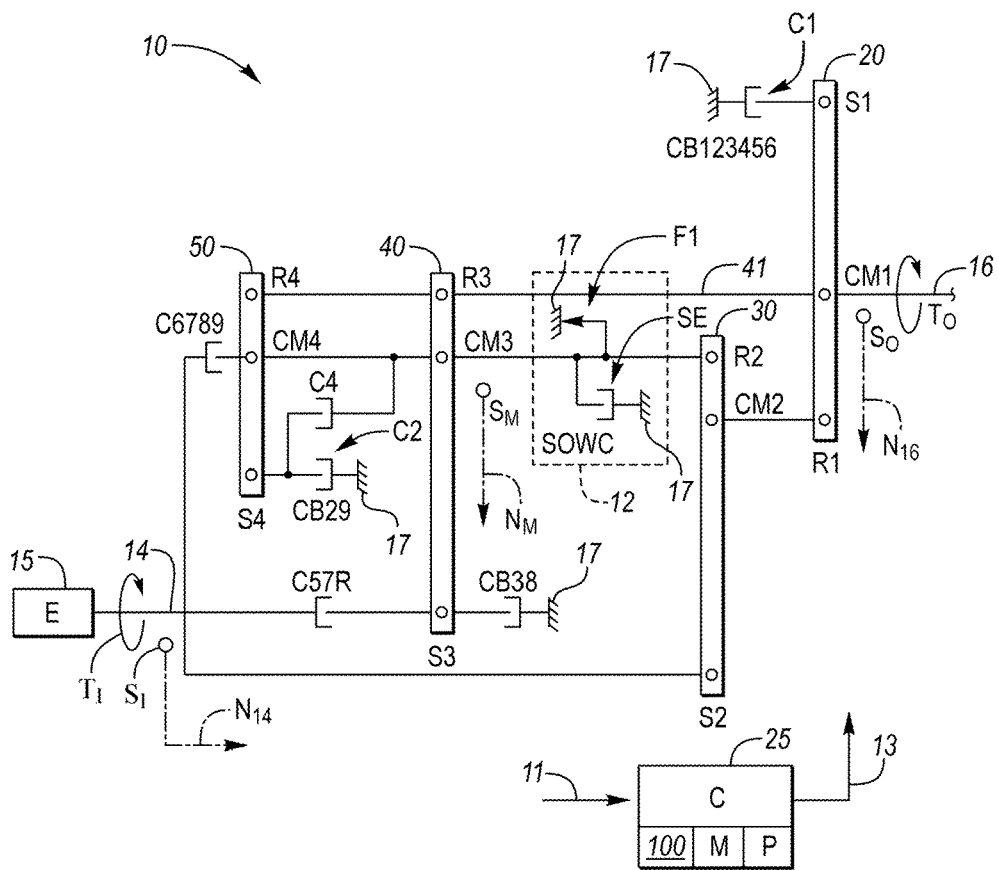
FIG. 1 is schematic illustration of an example multi-speed transmission having a selectable one-way clutch and a controller programmed to release the selectable one-way clutch according to the method disclosed herein.

Referring to the drawings, wherein like reference numerals refer to like or similar components throughout the several figures, an example multi-speed automatic transmission 10 is shown in FIG. 1. The transmission 10 includes a selectable one-way clutch (SOWC) 12, an example embodiment of which is described below with reference to FIG. 2. Automatic release of the SOWC 12 is controlled via a controller (C) 25 according to a method 100 in order to facilitate a $1^{st}$ gear low (L1) to $2^{nd}$ gear low (L2) shift maneuver while engine braking. As is well known in the art, the process of engine braking occurs whenever engine compression and friction is allowed to act as a drag on a driveline, such as when a driver releases pressure from an accelerator pedal. Engine braking is therefore a way of slowing a vehicle without application of friction brakes. The benefits of engine braking are therefore extended from the L2 mode to the L1 mode via operation of the controller 25 and the method 100.

As explained below with reference to FIGS. 3 and 4, the controller 25 is programmed with control logic embodying the steps of the method 100. Execution of the method 100 in response to input signals (arrow 11) makes it possible for the controller 25 to command a release of the SOWC 12, via a set of clutch control signals (arrow 13), while the transmission 10 is still operating in the L1 mode. During engine braking in the L1 mode, the controller 25 can thus momentarily release an engine load acting on the struts or other torque-holding elements of the SOWC 12, thus enabling a shift to the L2 mode, with subsequent resumption of engine braking in the L2 mode.

The controller 25 shown schematically in FIG. 1 may be embodied as one or more digital computers having a processor P and tangible, non-transitory memory M, e.g., optical, magnetic, flash, or other read only memory. The controller 25 may also include sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

In a non-limiting example embodiment, the transmission 10 of FIG. 1 includes respective input and output members 14 and 16. The input member 14 receives input torque (arrow $T_I$) generated by an internal combustion engine (E) 15. A plurality of gear sets, e.g., planetary gear sets 20, 30, 40, and 50, transmit the input torque (arrow $T_I$) in different ratios to the output member 16 to ultimately power one or more drive axles (not shown). The SOWC 12, which includes a freewheeling element F1 and a selectable element S1, thus allows elements of the gear sets 30, 40, and 50 to rotate or to connect to a stationary member 17 preventing rotation depending on the operating mode.

The transmission 10 of FIG. 1 may be configured as an example 9-speed transmission as shown. In such an embodiment the transmission 10 may include a plurality of clutches, including rotating clutches C57R, C4, and C6789, and braking clutches CB38, CB29, and CB123456. The nomenclature CB123456 as used herein represents a braking clutch (CB) engaged in each of $1^{st}$-$6^{th}$ gears to connect a gear element or node of a particular gear set to a stationary member 17, e.g., a housing of the transmission 10. In the same nomenclature, the absence of a B corresponds to a rotating clutch. Thus, the particular gear in which a given clutch is engaged can be determined from the naming convention, e.g., CB29 is engaged in $2^{nd}$ and $9^{th}$ gears.

Each gear set 20, 30, 40, and 50 includes multiple gear elements or nodes. For instance, the gear set 20 includes nodes S1, CM1, and R1 representing a sun gear, carrier member, and ring gear, respectively. Gear set 30 includes nodes S2, CM2, and R2 respectively representing a sun gear, carrier member, and ring gear. Likewise, the gear sets 40 and 50 include ring gears, carriers, and sun gears, i.e., R3 and R4, CM3 and CM4, and S3 and S4, respectively.

In the example embodiment of FIG. 1, node CM2 of gear set 30 is directly and continuously connected to node R1 of gear set 20. Likewise, node R4 of gear set 50 is directly and continuously connected to node R3 of gear set 40, with node R3 in turn continuously and directly connected to node CM1 of gear set 20. Clutch C6789 selectively connects the input member to node CM4 of gear set 50. Clutch C57R selectively connects the input member to node S3 of gear set 40. Likewise, clutch C4 selectively connects node S4 of gear set 50 to node CM3 of gear set 40.

With respect to the various braking clutches of this embodiment, clutches CB29 and CB38 selectively connect nodes S4 of gear set 50 and S3 of gear set 40 to the stationary member 17. Clutch CB123456 selectively connects node S1 of gear set 20 to the stationary member 14. Clutches CB123456 and CB29 are respectively designated as first and second clutches C1 and C2 and controlled as set forth below with reference to FIGS. 3 and 4.

Speed sensors $S_I$ and $S_O$ may be connected to the input and output members 14 and 16. One or more mid-transmission speed sensors $S_M$ may be connected to a corresponding mid-transmission member, e.g., element 23 which connects the SOWC to nodes CM3 and R2 or node S3 in different embodiments. Thus, the input signals (arrow 11) may include the measured speeds of the input, mid-transmission, and output members, with the speeds indicated as arrows $N_{14}$, $N_M$, and $N_{16}$, respectively. Other input signals (arrow 11) may include a low gear setting from a park, reverse, neutral, drive, low (PRNDL) lever, such that the controller 25 is operable for detecting a requested L1-L2 mode shift via detection of a position of such a PRNDL lever as is known in the art.

Figure 2:
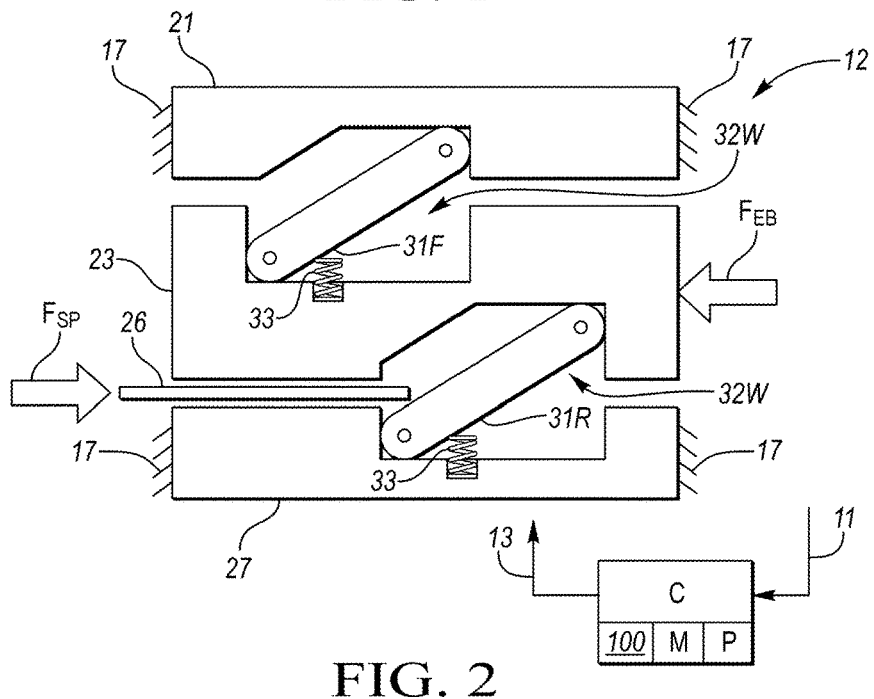
FIG. 2 is a schematic side view illustration of the selectable one-way clutch and controller of FIG. 1.

Referring to FIG. 2, the SOWC 12 of FIG. 1 is depicted in a locked state during an engine braking maneuver. The SOWC 12 includes first and second races 21 and 27, a rotating element 23 positioned between the races 21 and 27, and a rotatable selector plate 26. The first and second races 21 and 27 are connected to the stationary member 17, and are thus grounded or held stationary. An engine braking force (arrow $F_{EB}$) acts on the rotating element 23, and thus prevents rotation of the selector plate 26, when engine braking is active. While engine braking in L1 mode, the SOWC 12 is locked in both rotational directions by deployment of forward and reverse struts 31F and 31R, respectively, into strut wells 32W of the first race 21 and rotating element 23. Springs 33, as is known in the art, bias the struts 31R and 31F into a deployed position as shown. As the engine braking force (arrow $F_{EB}$) greatly exceeds a hydraulic or electromechanical selector plate force (arrow $F_{SP}$) acting in a direction opposite the engine braking force (arrow $F_{EB}$), the selector plate 26 cannot depress the reverse struts 31R into the strut wells 32W of the second race 27. As a result, engine braking is not usually permitted in L1 mode due to the SOWC 12 being unable to shift out of L1 mode, i.e., due to the struts 31F and 31R being loaded by the engine braking force (arrow $F_{EB}$).

To address such a control problem, the controller 25 receives the input signals (arrow 11) and selectively commands the momentary release of an input or first gear clutch, e.g., the first clutch C1 shown in FIG. 1, via the control signals (arrow 13). This control action momentarily reduces the engine braking force (arrow $F_{EB}$) by temporarily unloading the struts 31R of FIG. 2. In turn, the selector plate force (arrow $F_{SP}$), no longer opposed by the engine braking force (arrow $F_{EP}$), rotates the struts 31R out of engagement with the rotating element 23. The struts 31R are depressed into the strut wells 32W of the second race 27, thereby compressing the springs 33. In turn, this control action enables a quick shift of the transmission 10 to L2 mode from L1 mode. Engine braking in the L2 mode may thereafter commence, thereby enabling engine braking in the L1 and L2 modes.

Figure 3:
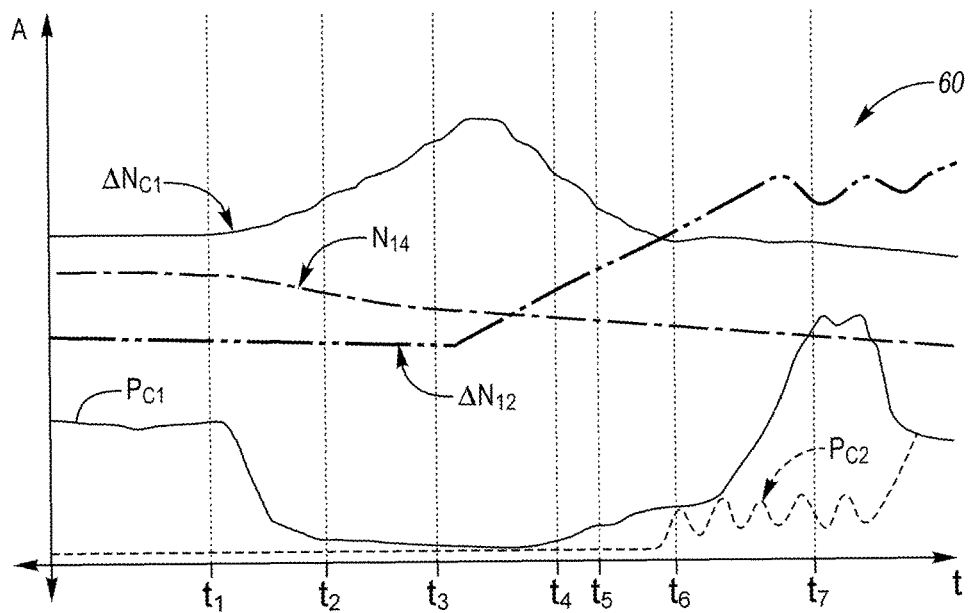
FIG. 3 is a time plot of changing amplitude of various control parameters during an example L1 to L2 shift of the transmission shown in FIG. 1.
Figure 4:
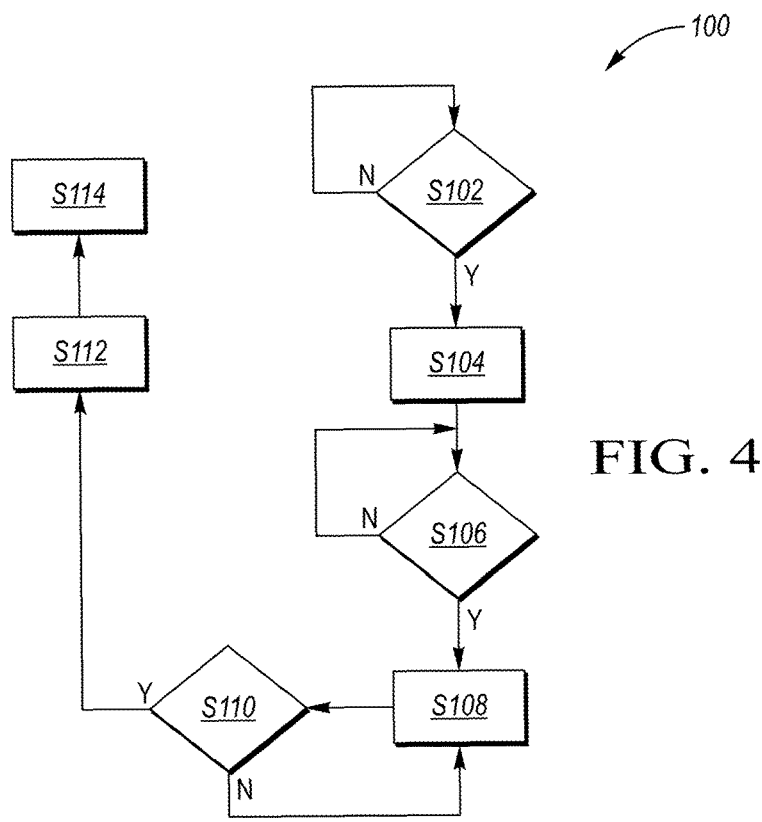
FIG. 4 is a flow chart describing an example method for releasing the selectable one-way clutch of FIGS. 1 and 2 during the L1-L2 shift depicted in FIG. 3, with the method enabling engine braking in the L1 and L2 modes.

Referring to FIG. 3, a time plot 60 describes an example L1-L2 shift of the transmission 10 of FIG. 1 during engine braking. Amplitude (A) and time (t) are plotted on the respective vertical and horizontal axes. Trace $\Delta N_{C1}$ represents slip across an input clutch to the transmission 10 to place the transmission 10 in neutral, e.g., the first clutch C1 of FIG. 1, which is also labeled as clutch CB123456. Trace $\Delta N_{12}$ represents the level of slip of the SOWC 12, i.e., the speed differential of the SOWC 12, with zero slip indicating a locked SOWC 12. The time plot 60 also includes input speed (trace $N_{14}$), for instance turbine speed when using a hydrodynamic torque converter, with the gradual decrease of input speed indicating an active engine braking state. Clutch pressure commands $P_{C1}$ and $P_{C2}$ represent the pressure commands from the controller 25 to the respective first and second clutches C1 and C2 of FIG. 1. All speed variables may be directly measured via the input, output, and mid-transmission speed sensors $S_I$, $S_O$, $S_M$ as the rotational speeds (arrows $N_{14}$, $N_{16}$, $N_M$) as noted above, and/or calculated at any given node of the transmission 10 using known ratios of the gear elements 20, 30, 40, and 50, as is known in the art.

The various traces of FIG. 3 are further described with reference to FIG. 4, which depicts an example embodiment of the method 100. Step S102 includes detecting a driver-requested or autonomously-requested L1-L2 shift of the transmission 10. Step S102 may entail processing the input signals (arrow 11) to determine a position of a PRNDL lever, or in logic of the controller 25 to determine whether the transmission 10 is presently in the L1 mode and that current speed and/or torque conditions permit a shift to the L2 mode. The method 100 remains in step S102 until a requested L1-L2 shift is detected, at which point the controller 25 proceeds to step S104.

At step S104, the controller 25 commands a momentary release of the first clutch C1, i.e., the clutch CB123456 in the example transmission 10 of FIG. 1. The identity of the first clutch C1 may change with the configuration of the transmission 10. However, the first clutch C1 is an input clutch to the transmission 10 whose release establishes a neutral state by effectively disconnecting the engine 15 from the input member 14 of the transmission 10. In FIG. 3, release of the first clutch C1 occurs at about $t_1$, as indicated by the sharp drop in the clutch pressure command $P_{C1}$. The method 100 then proceeds to step S106.

Step S106 entails comparing a measured or calculated amount of slip of the first clutch C1 to a first calibrated slip threshold. That is, at about ti of FIG. 3 trace $\Delta N_{C1}$ begins to rise until just before $t_4$. The method 100 proceeds to step S108 once trace $\Delta N_{C1}$ rises above the first calibrated slip threshold.

Step S108 includes releasing the SOWC 12 in response to exceeding the first calibrated slip threshold in step S106. Step S108 may vary with the particular control strategy used to pressurize the SOWC 12. For instance, a given pressure control solenoid may be commanded off to enable the SOWC 12 to release oil and complete the commanded release. Optionally, step S108 may include requesting positive engine torque to assist with the release of the SOWC 12. For instance, between $t_2$ and $t_3$ the controller 25 may determine that the first clutch C1 is fully released, and may as a result transmit a request to an engine control module (not shown) as part of the control signals (arrow 13) or other control signals to supply a brief increase in engine torque from the engine 15 of FIG. 1. The method 100 proceeds to step S110 when release of the SOWC 12 has been commanded.

At step 5110, the controller 25 next determines whether the SOWC 12 has slipped above a second calibrated slip threshold. Slip of the SOWC 12, i.e., trace $\Delta N_{12}$ of FIG. 3, should begin to rise soon after release of the SOWC 12, with the rise in trace $\Delta N_{12}$ indicative of release of the SOWC 12. The controller 25 monitors trace $\Delta N_{12}$ for a threshold increase in slip and then proceeds to step S112 when trace $\Delta N_{12}$ exceeds the second calibrated slip threshold.

Step S112 includes reapplying the first clutch C1, as indicated by the rise in the clutch pressure command (trace $P_{C1}$) to first clutch C1 in FIG. 3 soon after $t_6$. Successful completion of step S112 results in a $1^{st}$ gear freewheeling mode, where rotation freely occurs across the SOWC 12 in one rotational direction. The method 100 then proceeds to step S114.

At step S114, the controller 25 next commands application of the second clutch C2, i.e., clutch CB29 in the example embodiment of FIG. 1, or another $2^{nd}$ gear clutch in other embodiments of the transmission 10. The application of the second clutch C2 can be seen by the rise in trace $P_{C2}$ of FIG. 3 shortly after $t_7$. Successful completion of step S114 results in 2L mode with engine braking.

Using the method 100 described above, engine braking functionality is made available in first gear of the transmission 10 while still obtaining the fuel economy, packaging, mass, and cost benefits of a selectable one-way clutch in lieu of a conventional friction plate clutch. As a result, engine braking is extended from $2^{nd}$ gear to $1^{st}$ gear. Other possible limitations are also addressed, such as eliminating the conventional requirement that the transmission 10 be locked in a first gear mode until positive engine torque is requested.

While the best modes for carrying out the disclosure have been described in detail, those familiar with the art to which this disclosure relates will recognize various alternative designs and embodiments for practicing the disclosure within the scope of the appended claims.

The invention claimed is:

1. A transmission for use with an engine, the transmission comprising:
   a stationary member;
   an input member connectable to the engine;
   a plurality of gear sets each having a plurality of nodes, including a ring gear, a sun gear, and a carrier member;
   a first clutch that, when applied, connects a node of one of the gear sets to the stationary member to establish a $1^{st}$ gear low (L1) mode;
   a second clutch that, when applied, connects a node of another one of the gear sets to the stationary member to establish a $2^{nd}$ gear low (L2) mode;
   a selectable one-way clutch (SOWC) connected between nodes of two of the gear sets; and
   a controller programmed, in response to a requested shift from the L1 mode to the L2 mode during an engine braking maneuver, to release the first clutch and thereby enter a neutral mode of the transmission, release the SOWC when a slip level across the first clutch exceeds a first calibrated slip threshold, reapply the first clutch when a slip level of the SOWC exceeds a second calibrated slip threshold to thereby enter a $1^{st}$ gear freewheeling mode, and apply the second clutch to enter the L2 mode and resume the engine braking maneuver.

2. The transmission of claim 1, wherein the plurality of gear sets includes first, second, third, and fourth gear sets, the first clutch connects a node of the first gear set to the stationary member, the SOWC is connected between nodes of the second and third gear sets, and the second clutch connects the fourth gear set to the stationary member.

3. The transmission of claim 2, wherein the transmission is a 9-speed automatic transmission.

4. The transmission of claim 3, wherein the first clutch connects the sun gear of the first gear set to the stationary member, the second clutch connects the sun gear of the fourth gear set to the stationary member, and the SOWC is connected between the ring gear of the third gear set and the carrier member of the third gear set.

5. The transmission of claim 1, further comprising a plurality of speed sensors positioned with respect to the transmission and operable for measuring rotational speeds of the input member, an output member, and a mid-transmission member of the transmission, wherein the controller is programmed to calculate the slip levels using the measured rotational speeds.

6. The transmission of claim 1, wherein the controller is programmed to release the SOWC by reducing a pressure command to the SOWC.

7. The transmission of claim 6, wherein the SOWC includes a pair of races, a plurality of struts, and a selector plate operable for depressing the struts into mating strut wells of one of the races, and wherein reducing pressure to the SOWC causes rotation of the selector plate sufficient for depressing the struts into the mating strut wells.

8. The transmission of claim 6, wherein the controller is programmed to request additional torque output from the engine to facilitate the release of the SOWC.

9. A method of shifting from a $1^{st}$ gear low (L1) mode to a second gear low (L2) mode in a transmission having a plurality of gear sets each having a plurality of nodes, including a ring gear, a sun gear, and a carrier member, the method comprising:
   detecting a requested shift maneuver from the L1 mode to the L2 mode during an engine braking maneuver;
   releasing a first clutch to enter a neutral mode of the transmission, wherein releasing the first clutch disconnects a node of one of the gear sets from a stationary member to exit the L1 mode;
   releasing a selectable one-way clutch (SOWC) when a slip level across the first clutch exceeds a first calibrated slip threshold, wherein the SOWC is connected between nodes of two of the gear sets;
   reapplying the first clutch when a slip level across the SOWC exceeds a second calibrated slip threshold to thereby enter a $1^{st}$ gear freewheeling mode; and
   applying the second clutch to connect a node of another one of the gear sets to the stationary member and thereby enter the L2 mode and resume the engine braking maneuver.

10. The method of claim 9, wherein the plurality of gear sets includes first, second, third, and fourth gear sets, the first clutch when applied connects a node of the first gear set to the stationary member, the SOWC is connected between nodes of the second and third gear sets, and the second clutch when applied connects the fourth gear set to the stationary member.

11. The method of claim 10, wherein the transmission is a 9-speed automatic transmission.

12. The method of claim 9, further comprising:
   measuring, via a plurality of speed sensors positioned with respect to the transmission, rotational speeds of an input member, output member, and mid-transmission member of the transmission; and
   calculating the slip levels via a controller using the measured rotational speeds.

13. The method of claim 9, wherein releasing the SOWC includes reducing pressure to the SOWC.

14. The method of claim 13, wherein the SOWC includes a pair of races, a plurality of struts, and a selector plate operable for depressing the struts into mating strut wells of one of the races, and wherein reducing pressure to the SOWC includes causing the selector plate to depress the struts into the mating strut wells.

15. The method of claim 13, wherein releasing the SOWC also includes requesting additional torque output from an engine via the controller to facilitate the release of the SOWC.

* * * * *